INVENTORS
MICHAEL J. PRYOR
WILLIAM H. ANTHONY

BY Robert H. Bachman
ATTORNEY

United States Patent Office 3,674,569
Patented July 4, 1972

3,674,569
METHOD OF MAKING A COMPOSITE CABLE SHEATHING HAVING AN ALUMINUM-SILICON LAYER
Michael J. Pryor, Woodbridge, and William H. Anthony, Guilford, Conn., assignors to Olin Mathieson Chemical Corporation
Application Sept. 11, 1968, Ser. No. 759,117, which is a continuation-in-part of application Ser. No. 677,955, Oct. 25, 1967, now Patent No. 3,579,313. Divided and this application Aug. 28, 1970, Ser. No. 67,978
Int. Cl. C22f 1/04; B23p 11/00
U.S. Cl. 148—11.5 A                    6 Claims

ABSTRACT OF THE DISCLOSURE

This invention relates to a high strength aluminum alloy containing Zn, B, Mg and Si metallurgically bonded to a thin layer of an aluminum alloy containing at least .050% Si, which thin layer is also bonded to steel for use in both aerial and underground cable sheathing.

---

This application is a division of copending application Ser. No. 759,117, filed Sept. 11, 1968.

This application is in turn a continuation-in-part of application Ser. No. 677,955, filed Oct. 25, 1967, now Pat. No. 3,579,313 which is hereby incorporated into the present application by reference.

Most underground cable sheathing now is made from either annealed Alloy 110 (99.9% pure Cu) or Alloy 220 (Copper Development Designation). The use of Alloy 110 predominates particularly in the medium and larger size cables.

Aerial cables are very often sheathed with annealed 1100 aluminum (Aluminum Association Designation).

The cable sheaths must provide adequate mechanical strength, suitable electrical conductivity and, for underground applications, high corrosion resistance.

There is an additional problem on underground cable sheathing with respect to rodent attack, particularly by gophers. For this reason, the gauge of copper cable sheathing used west of the Mississippi is 0.010", whereas, that used east of the Mississippi (where gophers are comparatively absent) is only 0.005".

Furthermore, the present scarcity and unstable price of copper has resulted in a search for other metallic systems which would be suitable for cable sheathing.

As an interim solution, stainless steel clad with copper has been investigated. However, its corrosion resistance at voids created in service in the exterior copper coating is too variable to warrant serious consideration. Evidently, copper is cathodic to stainless steels in many soils and promotes rapid perforation.

Three layer composites have also been proposed in U.S. Pat. 3,272,911. However, these composites suffer from the disadvantage of having poor corrosion resistance in soils.

A desirable cable sheathing should contain no copper alloy, should have acceptable electrical conductivity, should be mechanically strong enough to prevent rodent or animal attacks, such as gophers, and should be as corrosion resistant as possible.

Figure 1:
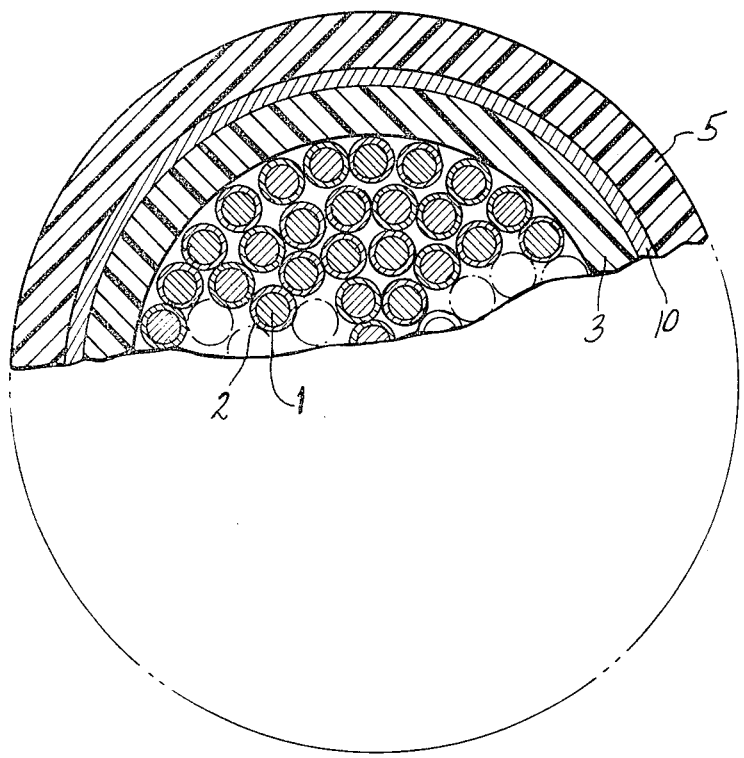
FIG. 1 is a sectional view of a typical cable sheath.

Cables in general are constructed as follows:

In FIG. 1, the conducting cables 1 are provided with insulation 2. A plurality of such insulated cables are provided within an inner jacket of insulation 3. The metallic sheath is shown generally at 10; its construction will be described in detail hereinafter. Finally, an external layer of insulation 5, also preferably made of a polymeric material, such as polyethylene, may be provided on the outside of the cable sheath.

As described in application Ser. No. 677,955, it has been found that a composite cable sheath made of an aluminum alloy as the outer cladding, metallurgically bonded to a steel core is a satisfactory solution to the previously mentioned cable sheath problems.

Figure 2:
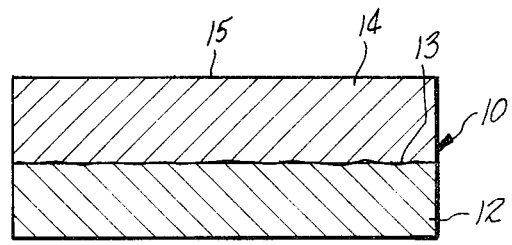
FIG. 2 is an enlarged partial sectional view of the cable sheath described in application Ser. No. 677,955.

Thus, for example, the cable sheath 10, as shown in the enlarged view, FIG. 2, comprises an aluminum alloy 14 metallurgically bonded at 13 to steel core 12. If desired, the surface 15 may be corrugated (not shown) if an external insulation layer 5 in FIG. 1 is utilized.

Thus, as described in application Ser. No. 677,955, it has been found that composites of aluminum alloys containing 0.2% to 2.0% zinc, 0.001% to 0.2% boron, and at least one hardening element, metallurgically bonded to steel, provides the necessary sacrificial corrosion resistance, electrical conductivity, and mechanical strength to withstand animal attacks. The aluminum alloy must have an electrical conductivity of at least 50% of the International Annealed Copper Standard. The boron content insures that the 50% level will be obtained. The zinc insures the necessary galvanic protection with respect to steel. In addition to the zinc and boron, there must be at least one additional element present to provide strength for the aluminum component.

The preferred zinc content to insure galvanic protection of steel is from 0.5% to 1.5% zinc. The preferred boron content is from 0.004% to 0.1%.

Thus, according to one embodiment of the invention described in application Ser. No. 677,995, the aluminum component must contain from 0.2% to 2.0% zinc, from 0.001% to 0.2% boron for electrical conductivity and from 0.05% to 0.4% iron to provide strength. The silicon content must be no more than 0.2%. The remaining impurities limitations are .05% each, total 0.15%. The preferred zinc content is 0.5% to 1.5% and the preferred boron content is 0.02% to 0.2%.

According to another embodiment of the invention described in application Ser. No. 677,955, the aluminum component must contain from 0.2% to 2.0% zinc, from 0.001% to 0.2% boron, together with up to 0.4% copper, 0.3% to 1.4% magnesium, 0.4% to 1.2% silicon, up to 0.2% manganese, up to 0.1% chromium, other impurities up to 0.05% each, total of such other impurities, 0.15% maximum.

Preferably, the zinc content is 0.5% to 1.5% and the boron content of from 0.004% to 0.1%. Also, preferably, the silicon content is from 0.5% to 0.9%, and the magnesium content is from 0.5% to 0.9%.

In the foregoing composites, mild steel having a carbon content as low as 0.01% may be used. There must be enough carbon in the steel so that a strength of at least 25,000 p.s.i. yield strength is provided. Steels having carbon contents higher than mild steel can also be used, provided they show an excess of 5% elongation in the condition used. The steel provides the strength for the composite so that it can effectively resist animal and rodent attack. If desired, of course, conventional alloying elements for steel such as chromium, manganese, nickel, cobalt in proportions commonly used in alloy steels may be used. However, from a standpoint of economics, it is usually less expensive to employ straight carbon steels. For some applications, if it is desired to provide even greater corrosion resistance insurance, conventional stainless steel of the 300 and 400 series and known modifications thereof, may be used. If this is done, the 300 series is preferred as, in general, the 300 series is less brittle than the 400 series. However, as mentioned previously, in general ordinary carbon steel can easily provide the needed composite strength.

The previously described aluminum component must be present in an amount of at least 25% of the thickness of the composite. A preferred thickness ratio of the aluminum component to steel is 7 to 3.

When the composite is made of the previously mentioned .02% to 2% zinc, and 0.001% to 0.2% boron, 0.05% to 0.4% iron, aluminum alloy, only annealing at 1000 to 1100° F. for 1 to 60 minutes is required prior to use. This treatment insures softening of the iron core, as well as the aluminum cladding.

However, the zinc, boron, magnesium, silicon alloy requires heat treatment for optimum strength, ductility, and electrical conductivity. After the composite is cold rolled to final gauge, it should be heated at a temperature of 1000 to 1150° F. for a period of time from 1 to 60 minutes depending on the thickness. This treatment insures softening of the iron core. The composite should then be cooled to room temperature at a rate of at least 400° F. per minute, room temperature being a temperature of less than 300° F.

The composite should then be heated at a temperature of from 250 to 400° F. for a period of time of from 15 minutes to 24 hours. This treatment increases the strength and conductivity of the aluminum component. The preferred range for this latter treatment is 300° F. to 325° F. for a period of time of 2 to 8 hours. This treatment results in a yield strength of at least 35,000 p.s.i. and a conductivity of at least 52% to IACS. The composite is then ready for forming the bundle shown in FIG. 1.

As disclosed in application Ser. No. 677,955, in the case of aluminum components containing less than 0.5% silicon, including both the Al-Zn-B-Ic alloy and the Al-Zn-Mg-Si-B alloys, it is very desirable to provide an aluminum alloy layer having a thickness of 5 to 10% of the aluminum component which alloy layer contains at least 0.5% silicon to prevent bond degradation of the aluminum component steel bond during annealing.

Other methods of bonding the silicon containing layer to the aluminum component will be apparent to those skilled in the art.

After the formation of the aluminum component-aluminum silicon alloy composite, this composite is then bonded to the steel component.

In bonding the aluminum component to the steel, the face of the aluminum layer containing silicon is bonded to the iron base alloy.

The bonding process used to bond the aluminum component to the steel core is not critical so long as a sound metallurgical bond, free from intermetallics, is obtained. For example, the bond can be formed according to the Rader, Goldman, Winter process described in Ser. No. 549,319. Briefly, this process comprises providing the core in a thickness less than ½", providing the cladding in plate form in the thickness less than ¼", rolling together said core and cladding to form a green bond, cold rolling the resulting poorly bonded composite at least 50%. In the case of iron core composites, the green bond is formed with a rolling reduction of from 40% to 65%, with a subsequent cold rolling reduction requiring at least an additional 10% to give a total reduction of at least 60%. However, if desired, the bond can be formed by heating the core as described in U.S. Pat. 3,381,366 to a temperature of at least 300° F. Still another process described in Ser. No. 538,697 could be used in which the rolling operation causes one component only to recrystallize. However, the previously described Rader, Goldman, Winter process is preferred.

After the bond is formed, the composite is cold rolled to final gauge.

After the previously described annealing treatment, the composite is ready for the formation of the cable bundle shown in FIG. 1 according to conventional techniques well known to those skilled in the art.

It has been found according to the present invention that during the annealing treatment in order to soften the iron component, the bond between the aluminum component and the iron component is reduced in strength and ductility. It has been found that this is the case even where the aluminum component contains silicon as high as 0.75%.

It has been found that the bond is degraded due to the formation of intermetallic compounds at the core-clad interface.

According to the present invention, it has been found that this bond deterioration can be avoided by providing an additional layer of aluminum containing at least 0.75% silicon between the iron component and the previously described aluminum component. The silicon content of this additional aluminum layer should be from 0.75% to 5.0% silicon, preferably from 1 to 2% silicon. The layer may also contain other conventional alloying elements in addition to the silicon.

In the case where a two-membered composite is to be used, the addition of the silicon containing layer would provide a tri-clad article. In the case where the iron composite is clad on both sides with the aluminum component, a five-membered clad article to be used.

Figure 3:
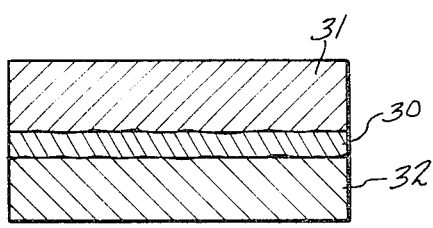
FIG. 3 is an enlarged partial sectional view of the three-membered cable sheath of the present invention.

Thus, as shown in FIG. 3, the aluminum layer containing silicon 30 would lie between the aluminum component 31 and the iron base alloy or steel component 32.

Figure 4:
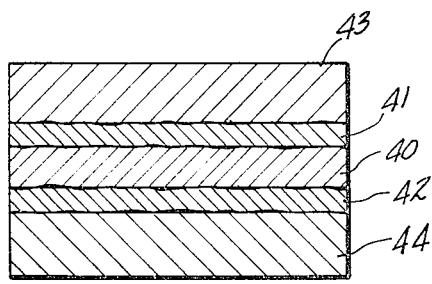
FIG. 4 is an enlarged partial sectional view of a five-membered cable sheath of the present invention.

In FIG. 4, in the five-membered article, the steel component 40 is surrounded by two aluminum layers containing silicon 41 and 42. The aluminum components 43 and 44 are then found on the outside of the composite.

In either case, the thickness of the additional layer should be from 5 to 10% of the thickness of the aluminum component.

It has been found that when such a composite is annealed at a temperature of 1000 to 1150° F. in order to soften the iron component and render the iron component ductile, there is no reduction in bond strength or ductility of the composite.

The silicon containing aluminum layer is bonded to the previously described aluminum component by any of the well-known treatments in the art to effect the formation of such a cladded product. For example, this can be done by the processes described in U.S. Pat. No. 3,381,366, issued May 7, 1968 to Winter, which may be summarized as follows: providing an aluminum core (the aluminum component) in plate form in a thickness less than ½"; providing a cladding (the aluminum alloy containing silicon) in plate form in a thickness less than ¼"; heating said core to a temperature between 150 and 1050° F.; rolling together said core and cladding at a speed of at least 25 and preferably 100 feet per minute in one pass at a reduction between 35 and 80%, with the core and cladding coming together for the first time in the bite of the rolls, said cladding contacting the roll prior to contacting said core, with the included angle between core and cladding upon entering the rolls being in excess of 5 degrees.

The magnesium content must be less than 1.0%, preferably less than .2% in order that a sufficient amount of silicon may be available to avoid bond degradation. It is, of course, understood that at the lowest silicon contents the amount of magnesium must be correspondingly small. The amount of other alloying elements in addition to magnesium and silicon may be as follows: copper, iron, chromium and nickel may be up to 1.5%. Titanium, zinc and manganese may be present up to 1%.

It will be, therefore, apparent to those skilled in the art that a number of alloying elements may be included in the silicon layer of the present invention without departing from the essential character of the layer of avoiding the aluminum-iron degradation.

The following examples illustrate the invention, but are in no way to be interpreted as limiting its scope:

EXAMPLE I

A composite having an aluminum component containing 1% zinc, .1% boron, 0.2% iron and silicon .2%, others each 0.5%, total 1.5% was clad on both sides to a steel core having a carbon content of .25%, according to the teachings of U.S. Pat. No. 3,381,365. The resulting composite was about 0.009 inch thick (.006 Al/.003 steel). After bonding, the composite was cold rolled and annealed at a temperature of 1075° F. for one hour. The composite was then cooled to room temperature at a rate in excess of 400° F. per minute.

The composite was brittle and displayed lack of ductility. The bond was extremely weak and was peelable by hand.

EXAMPLE II

The composite having the composition of Example I was strip annealed in an electrical resistance furnace having a heating zone length of 9 feet and a width of 39 inches. The strip was passed through the furnace at a speed of 12 feet per minute. The length of the heating zone was 8 feet while the temperature was 1340 to 1360° F.

Upon cooling to room temperature at a rate in excess of 400° F. per minute, the composite was brittle and the bond was peelable by hand.

EXAMPLE III

An aluminum alloy containing .75% silicon, .2% iron, .01% magnesium, all others less than .1%, total less than .5%, was bonded to an aluminum component having the composition of the aluminum component of Example I according to the teachings of U.S. Pat. No. 3,381,366.

This composite was, in turn, bonded to a steel component having the same composition as the steel component in Example I (0.25% carbon). The face of the aluminum layer containing silicon was bonded to the steel according to the teachings of application Ser. No. 549,319. The resulting composite was about .0096 inch thick (.006 Al/.0006 Al/.003 steel). The three-membered composite was then cold rolled and annealed at a temperature of 1075° F.

Upon cooling to room temperature at a rate in excess of 400° F. per minute, the composite was ductile and the steel-aluminum bonds were very strong; it took an excess of 100 pounds per inch of width to break the bond.

EXAMPLE IV

The three-membered composite of Example III was strip annealed in the furnace described in Example II and maintained at a temperature of 1340 to 1360° F. at a speed of 12 feet per minute.

Upon cooling to room temperature at a rate in excess of 400° F. per minute, the composite was ductile and the steel-aluminum bonds were very strong; it took an excess of 100 pounds per inch of width to break the bond.

EXAMPLE V

An aluminum component having a zinc content of 1%, a boron content of .1% together with .2% copper, 1% magnesium and .45% silicon, .1% manganese and 0.5% chromium, others up to 0.5% each, total others 0.15% maximum, was bonded to a steel component containing 0.25% carbon according to the teachings of application Ser. No. 549,319. The composite was about .009 inch thick (.006 Al/.003 steel). The composite was then cold rolled to final gauge and annealed at a temperature of 1075° F. for one hour.

Upon cooling to room temperature at a rate in excess of 400° F. per minute, the composite was found to lack ductility and the bond was peelable by hand.

EXAMPLE VI

Example V was repeated using the furnace and the strip annealing conditions described in Examples II and IV.

Upon cooling to room temperature at a rate in excess of 400° F. per minute, the composite was brittle and the bond was weak and peelable by hand.

EXAMPLE VII

An aluminum alloy containing .75% silicon, .2% iron, .01% magnesium, all others less than .1%, total less than .5%, was bonded to the aluminum component of Example I according to the teachings of U.S. Pat. No. 3,381,366. This composite was then bonded to a steel core containing 0.25% carbon with the silicon containing layer forming the interface with the steel. The bonding technique was that described in application Ser. No. 549,319. The resulting composite was approximately .0096 inch thick (.006 Al/.0006 Al/.003 steel). The composite was heated to a temperature of 1075° F. for one hour.

Upon cooling to room temperature at a rate in excess of 400° F. per minute, the composite was found to be ductile and the bond was very strong; it took an excess of 100 pounds per inch of width to break the bond.

EXAMPLE VIII

The three-membered composite of Example VII was strip annealed using the furnace and the conditions described in Examples II and IV.

Upon cooling to room temperature at a rate in excess of 400° F. per minute, the composite was found to be ductile and the bonds were very strong. It required an excess of 100 pounds per inch of width to break the steel-aluminum bond.

EXAMPLE IX

A five-membered composite was prepared in which a steel component was clad on both sides with composite aluminum layers. The composite aluminum layers were made up of an aluminum component and an aluminum alloy layer. The aluminum component had the composition disclosed in Example I. The aluminum alloy layers contained .75% silicon. The two aluminum alloys were first clad to the two aluminum components according to the teachings of U.S. Pat. 3,381,366. These two aluminum composites were then bonded to the steel core according to the teachings of application Ser. No. 549,319. The resulting composite was approximately .019 inch thick (0.006 Al/.0006 Al/.003 steel/.0002 Al/.002 Al).

The five-membered composite was strip annealed, using the furnace and conditions used in Examples II and IV.

Upon cooling to room temperature at a rate in excess of 400° F. per minute, the composite was found to be ductile and the bonds were very strong. It required an excess of 100 pounds per inch of width to break the steel-aluminum bonds.

It is to be understood that the invention is not limited to the illustrations described and shown herein which are deemed to be merely illustrative of the best modes of carrying out the invention, and which are susceptible of modifications of form, size, arrangement of parts and detail of operation, but rather is intended to encompass all such modifications which are within the spirit and scope of the invention as set forth in the appended claims.

What is claimed is:

1. A process for heat treating a composite containing iron as the core, and an aluminum alloy cladding containing 0.2% to 2.0% zinc, 0.1% to 0.2% boron and at least one element which provides strength comprising:
providing an aluminum alloy layer containing at least 0.5% silicon, bonding the aluminum layer containing silicon to the steel and to the said aluminum component, heating the so-bonded composite to a temperature of from 1000° F. to 1150° F. and cooling the composite to room temperature, the said heating step rendering the steel component ductile and the composite substantially free of bond degradation at the steel-aluminum interface.

2. A process according to claim 1 in which the element which provides strength is iron.

3. A process according to claim 1 in which magnesium and silicon are added as the elements which provide strength, and in which after the annealing treatment, the composite is cooled to room temperature at a rate of at least 400° F. per minute and in which the composite is heated to a temperature of 250° F. to 400° F. for a period of time of from 15 minutes to 24 hours.

4. A process according to claim 1 in which the aluminum alloy containing silicon is from 5 to 10% of the thickness of the aluminum component.

5. A process according to claim 4 in which the silicon content in the aluminum alloy layer is not more than 5%.

6. A process according to claim 5 in which the silicon content is from 1 to 2%.

References Cited

UNITED STATES PATENTS

| | | | |
|---|---|---|---|
| 2,965,963 | 12/1960 | Batz et al. | 148—11.5 A |
| 3,268,369 | 8/1966 | Haugen | 148—127 |
| 3,463,620 | 8/1969 | Winter | 29—196.2 |
| 3,498,849 | 3/1970 | Munday et al. | 148—11.5 A |

L. DEWAYNE RUTLEDGE, Primary Examiner

W. W. STALLARD, Assistant Examiner

U.S. Cl. X.R.

148—12, 12.7, 127